(12) United States Patent
Dalcher

(10) Patent No.: US 11,328,063 B2
(45) Date of Patent: May 10, 2022

(54) IDENTIFICATION OF MALICIOUS EXECUTION OF A PROCESS

(71) Applicant: McAfee, LLC, San Jose, CA (US)

(72) Inventor: Greg W. Dalcher, Tigard, OR (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 16/671,586

(22) Filed: Nov. 1, 2019

(65) Prior Publication Data
US 2020/0065493 A1 Feb. 27, 2020

Related U.S. Application Data

(63) Continuation of application No. 14/581,528, filed on Dec. 23, 2014, now Pat. No. 10,467,409.

(51) Int. Cl.
| | | |
|---|---|---|
| H04L 9/18 | (2006.01) | |
| H04L 9/20 | (2006.01) | |
| G06F 21/56 | (2013.01) | |
| G06F 21/52 | (2013.01) | |

(52) U.S. Cl.
CPC ............ *G06F 21/566* (2013.01); *G06F 21/52* (2013.01); *G06F 2221/033* (2013.01)

(58) Field of Classification Search
CPC .................................................... G06F 21/566
USPC ......................................................... 726/23
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,138,238 A | 10/2000 | Scheifler | |
| 6,460,050 B1 | 10/2002 | Pace et al. | |
| H2196 H | 7/2007 | Tester | |
| 7,506,155 B1 | 3/2009 | Stewart et al. | |
| 7,565,686 B1 * | 7/2009 | Sobel | G06F 21/51 713/164 |
| 7,814,544 B1 * | 10/2010 | Wilhelm | G06F 21/566 726/22 |
| 7,971,255 B1 * | 6/2011 | Kc | G06F 21/566 726/24 |
| 8,214,900 B1 * | 7/2012 | Satish | G06F 21/554 726/23 |
| 8,312,249 B1 * | 11/2012 | Trumbull | G06F 9/4484 711/203 |

(Continued)

FOREIGN PATENT DOCUMENTS

| | | |
|---|---|---|
| EP | 2141598 A1 | 1/2010 |
| KR | 10-2011-0048670 A | 5/2011 |
| WO | WO 2016/105821 | 6/2016 |

OTHER PUBLICATIONS

Yi Hu; Identification of Malicious Transactions in Database Systems; IEEE:2003; pp. 1-7.*

(Continued)

*Primary Examiner* — Monjur Rahim
(74) *Attorney, Agent, or Firm* — Patent Capital Group

(57) ABSTRACT

Particular embodiments described herein provide for an electronic device that can be configured to intercept a process, store execution profiling for the process if the process involves a privileged resource or a privileged operation, and analyze the code involved in each stack frame to determine malicious activity. If the process does not involve a privileged resource or a privileged operation, then the process is not analyzed.

20 Claims, 7 Drawing Sheets

(56) References Cited

U.S. PATENT DOCUMENTS

| | | | |
|---|---|---|---|
| 8,950,007 B1* | 2/2015 | Teal | G06F 21/57 726/30 |
| 10,467,409 B2 | 11/2019 | Dalcher | |
| 2003/0217140 A1* | 11/2003 | Burbeck | H04L 29/12009 709/224 |
| 2006/0026687 A1 | 2/2006 | Peikari | |
| 2006/0095969 A1* | 5/2006 | Portolani | H04L 67/1002 726/23 |
| 2008/0195868 A1* | 8/2008 | Asokan | G06F 21/64 713/176 |
| 2009/0007223 A1* | 1/2009 | Centonze | G06F 21/6227 726/1 |
| 2009/0177956 A1* | 7/2009 | Huang | G06F 40/174 715/221 |
| 2009/0282477 A1* | 11/2009 | Chen | G06F 21/51 726/22 |
| 2010/0031360 A1* | 2/2010 | Seshadri | G06F 21/57 726/24 |
| 2010/0274910 A1* | 10/2010 | Ghanaie-Sichanie | H04L 63/083 709/229 |
| 2011/0067010 A1* | 3/2011 | Dullien | G06F 21/564 717/132 |
| 2011/0185417 A1* | 7/2011 | Zhou | G06F 21/566 726/22 |
| 2011/0289586 A1* | 11/2011 | Kc | G06F 21/566 726/24 |
| 2012/0117644 A1* | 5/2012 | Soeder | G06F 21/554 726/22 |
| 2012/0159566 A1 | 6/2012 | Hrastnik | |
| 2012/0291131 A1* | 11/2012 | Turkulainen | G06F 21/554 726/24 |
| 2014/0075555 A1* | 3/2014 | Shilimkar | G06F 21/56 726/23 |
| 2014/0115652 A1* | 4/2014 | Kapoor | G06F 21/567 726/1 |
| 2014/0215602 A1* | 7/2014 | Chuaprasort | H04L 63/0876 726/20 |
| 2014/0245446 A1* | 8/2014 | Shanmugavelayutham | G06F 21/54 726/24 |
| 2014/0310809 A1* | 10/2014 | Li | G06F 21/84 726/23 |
| 2014/0325650 A1* | 10/2014 | Pavlyushchik | G06F 21/566 726/23 |
| 2015/0199532 A1* | 7/2015 | Ismael | G06F 21/552 726/30 |
| 2016/0180089 A1 | 6/2016 | Dalcher et al. | |
| 2016/0234307 A1* | 8/2016 | Yan | H04L 67/42 |

OTHER PUBLICATIONS

Linn, C.M., "Protecting Against Unexpected System Calls," USENIX Security, 2005, 22 pages.

* cited by examiner

IDENTIFICATION OF MALICIOUS EXECUTION OF A PROCESS

CROSS REFERENCE TO RELATED APPLICATION

This application is a continuation of U.S. application Ser. No. 14/581,528 filed Dec. 23, 2014, entitled "IDENTIFICATION OF MALICIOUS EXECUTION OF A PROCESS," which is hereby incorporated by reference in its entirety.

TECHNICAL FIELD

This disclosure relates in general to the field of information security, and more particularly, to identification of malicious execution of a process.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
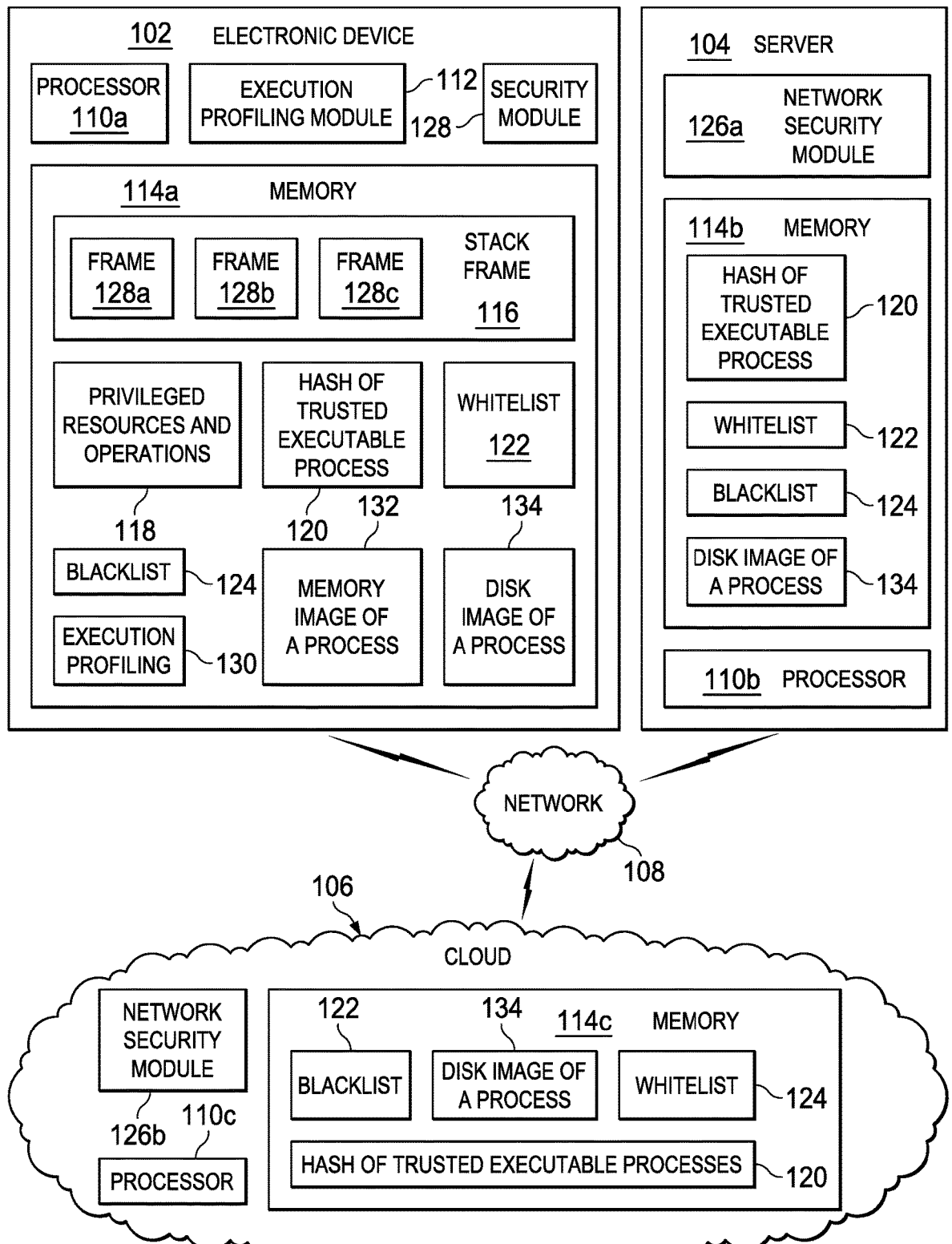
FIG. 1 is a simplified block diagram of a communication system for the identification of a malicious execution of a process in accordance with an embodiment of the present disclosure.

FIG. 1 is a simplified block diagram of a communication system for the identification of malicious execution of a process in accordance with an embodiment of the present disclosure. Communication system 100 can include an electronic device 102, a server 104, and a cloud 106. Electronic device 102 can include a processor 110a, an execution profiling module 112, memory 114a, and security module 128. Memory 114a can include a stack frame 116 (e.g., a call stack), privileged resources and operations 118, hash of trusted executable process 120, a whitelist 122, a blacklist 124, execution profiling 130, memory image of a process 132, and disk image of a process 134. Stack frame 116 can include frames 128a, 128b, and 128c. Server 104 can include a processor 110b, memory 114b, and a network security module 126a. Memory 114b can include hash of trusted executable process 120, whitelist 122, blacklist 124, and disk image of a process 134. Cloud 106 can include a processor 110c, memory 114c, and a network security module 126b. Memory 114c can include hash of trusted executable process 120, whitelist 122, blacklist 124, and disk image of a process 134. Electronic device 102, server 104, and cloud 106 can be in communication with each other using network 108.

In example embodiments, communication system 100 can be configured to include a system to provide identification of malicious execution of a process. Execution profiling module 112 can be configured to monitor a system for access requests to sensitive and privileged resources, requests to perform privileged operations, and perform identification of a malicious execution of a process. The monitoring can also be applied to any process or area of memory that may be at risk of being used as a gateway for malware, such internet browsers. Execution profiling module 112 can be configured to identify code involved in intercepted operations or processes that attempt to access sensitive and privileged resources and requests to perform privileged operations. Execution profiling module 112 can also be configured to validate the identified code and ensure that the code is fully vetted, un-tampered, and authorized for the operation or process. In another example, security module 128 can be configured to validate the identified code. In addition, execution profiling module 112 can check and ensure that the code is signed by a trusted source. The process is particularly useful with applications such as web browsers that load external data (such as web pages) as part of normal operations. Malicious forms of this external data can use exploits to execute code within the hosting process, and break out of the process through modification of system resources and use of privileged operations. Communication system 100 can be configured to validate all code involved in privileged operations and access to privileged resources and ensure the code is legitimate, thereby containing or reducing the risk of break out and subversion. The validation and identification of the code can be performed without compromising normal operations of the hosting process.

Elements of FIG. 1 may be coupled to one another through one or more interfaces employing any suitable connections (wired or wireless), which provide viable pathways for network (e.g., network 18) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

In current systems, privileged operations and sensitive and privileged system resources (e.g., privileged resources and operation 118) need to be protected from injected malicious code or loaded malicious content within the process while allowing the process to execute correctly and access system resources as needed for its normal operation. The term "sensitive and privileged system resources" is inclusive of a protected region of memory that is typically only accessible to trusted services and applications. Generally, most processes cannot write or otherwise alter the data stored in the sensitive and privileged system resources.

Current solutions typically restrict operations and access for a process entirely. For example, typically solutions include sandboxing and whitelisting often distinguish or focus on the code operating within a process that is responsible for an intercepted operation. What is needed is a solution in the problem space that sandboxing (including browsers and boxing) and whitelisting products attempt to address, but without the interoperability issues commonly encountered with these solutions.

A communication system for the identification of a malicious execution of a process, as outlined in FIG. 1, can resolve these issues (and others). Communication system 100 can be configured to selectively allow or disallow intercepted operations based on the code involved. This allows an application such as an Internet browser to operate normally and in a non-fettered manner. Only if the browser initiates a privileged operation or access to a restricted resource is the identification of the code involved performed. This avoids problems normally inherent with whitelisting solutions for containing operations and sandboxing. All code in the browser and all loaded content are allowed to operate fully and normally, as long as it does not initiate a privileged operation or access request. Most legitimate operations will not involve a privileged operation or a privileged access request. Thus most legitimate operations will not be affected. Additionally, sandboxing solutions normally have difficulty in allowing for persistence of data between sessions, as all operations are sandboxed. Communication system 100 allows for persisting data as part of normal operations. Even persisting of data to privileged areas can be allowed if all the code involved is validated as legitimate. Another advantage is the system can detect and stop malware exploiting a host process regardless of how the malware became present in the process or what exploits the malware uses. Complex rules and exceptions are not required to provide protection. The checks are basic and applied in a uniform (vs special-case) manner. The system can be configured to allow offline analysis of samples by network security modules 128a and 128b (such as pdfs and web pages), and to client-side protection against malware intrusion and breakout.

Most operations will not involve privileged resources or privileged operations. Even loaded content that is not fully vetted (such as a web page loaded in a browser from an unknown site) will not normally and legitimately invoke privileged operations or operations against privileged resources. Thus, nearly all activity of the monitored process will not trigger analysis of stack frame 116 by execution profiling module 112.

When a monitored process does trigger an analysis of stack frame 116 (e.g., a request to access sensitive and privileged resources or a request to perform privileged operations) the analysis of stack frame 116 can include analyzing the code involved in each frame of stack frame 116 (e.g., each frame 128a, 128b, and 128c) to determine malicious activity. In an example, each frame of stack frame 116 can be examined as it unwinds from stack frame 116. In another example, the analysis of stack frame 116 can be performed by monitoring RET instructions executed for a specified thread. Monitoring these instructions is possible using EXP, which can efficiently monitor for invocation of specific instructions and invoke registered callback when each instruction executes for monitored threads. Binary translation (BT), CPU extensions, or any other similar process may be used for EXP monitoring.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, electronic device 102, server 104, and cloud 106 can include memory elements (e.g. memory 114a-114c) for storing information to be used in the operations outlined herein. Electronic device 102, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. For example, memory image of a process 132 may be kept in RAM while disk image of a process 134 may be kept on a hard drive. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, server 104, and cloud 106 may include software modules (e.g., execution profiling module 112 and network security module 126a and 126b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102, server 104, and cloud 106 may include a processor (e.g., processor 110a-110c) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although execution profiling module 112 is represented in FIG. 1 as being located in electronic device 102 and network security modules 126a and 126b as being located in server 104 and cloud 106 respectively this is for illustrative purposes only. Execution profiling module 112 and network security modules 126a and 126b could be combined or separated in any suitable configuration. Furthermore, network security modules 126a and 126b could be integrated with or distributed in another network accessible by electronic device 102. Cloud 106 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
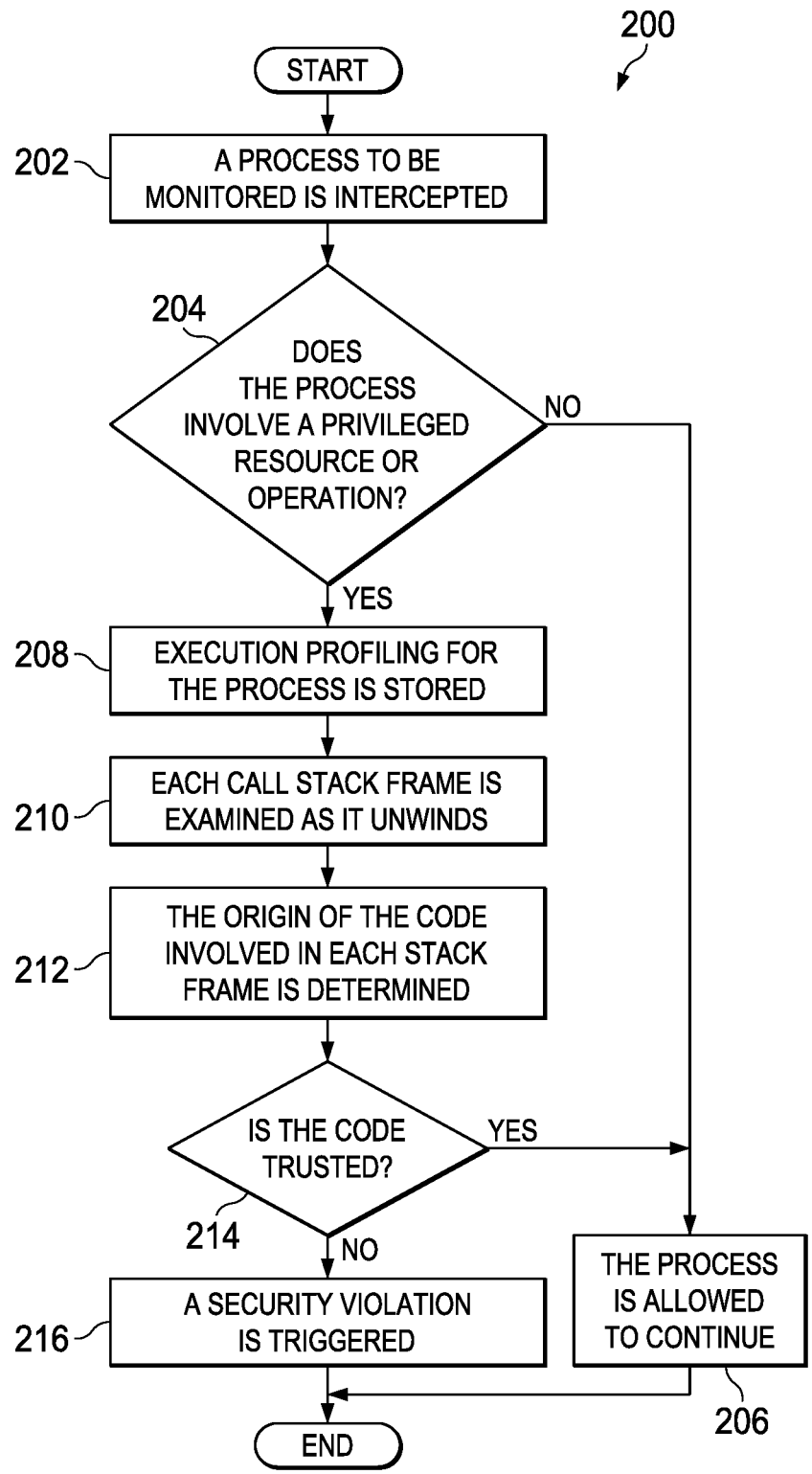
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with the identification of a malicious execution of a process, in accordance with an embodiment. In an embodiment, one or more operations of flow 200 may be performed by execution profiling module 112 and network security module 126a and 126b. At 202, a process to be monitored is intercepted. At 204, the system determines if the process involves a privileged resource or operation. If the process does not involve a privileged resource or operation, then the process is allowed to continue, as in 206. If the process does involve a privileged resource or operation, then execution profiling for the process is stored, as in 208. For example, the execution profiling can be stored in memory 114a and can include stack frame 116. At 210, each call stack frame is examined as it unwinds. For example, each call from a stack frame (e.g. each frame 128a, 128b, 128c in stack frame 116) can be examined as it unwinds. At 212, the origin of the code involved in each stack frame is determined. At 214, the system determines if the code is trusted. For example, an analysis can include examining the code identified to determine if the memory it resides is writeable. If the memory where the identified code resides is writeable, then the code can be considered not trusted. The analysis can also include determining if the code resides in memory that is part of the stack area. If the memory where the identified code resides is part of the stack area, then the code can be considered not trusted. If the code is trusted, then the process is allowed to continue as in 206. If the code is not trusted, then a security violation is triggered, as in 216. The trigger of the security violation can include any remedial action that may be taken when malware is detected. For example, the process may be blocked, allowed to be executed and traced for analysis, ect.

Figure 3:
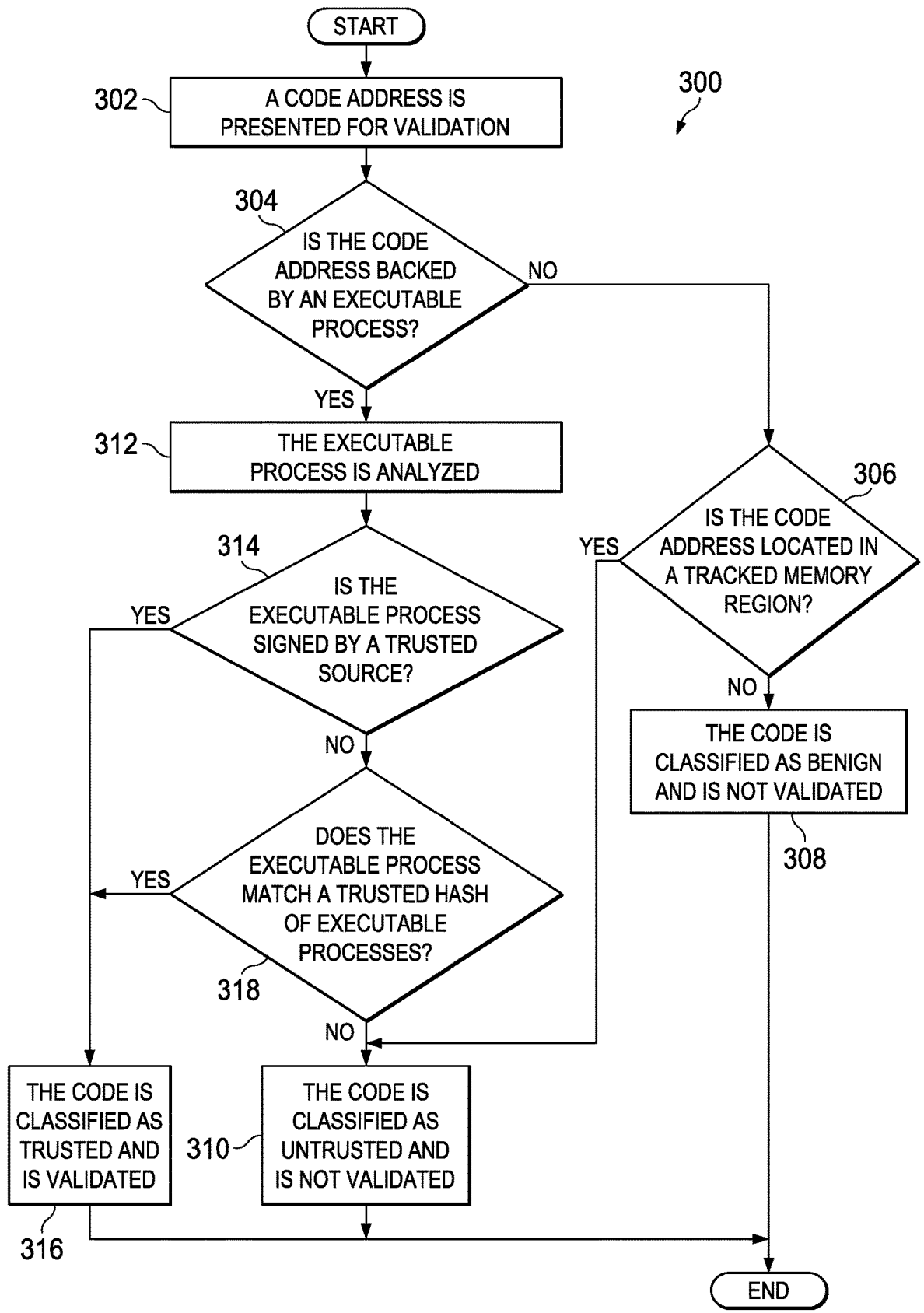
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the identification of a malicious execution of a process, in accordance with an embodiment. In an embodiment, one or more operations of flow 300 may be performed by execution profiling module 112 and network security module 126a and 126b. At 302, a code address is presented for validation. At 304, the system determines if the code address is backed by an executable process. If the code address is not backed by an executable process, then the system determines if the code address is located in a tracked memory region (e.g., a protected region of memory such as privileged resources and operations 118), as in 306. If the code address is not located in a tracked memory region, then the code is classified as benign and is not validated, as in 308. If the code address is located in a tracked memory region, then the code is classified as untrusted and is not validated, as in 310.

Returning to 304, if the code address is backed by an executable process, then the executable process is analyzed, as in 312. For example, the code address may be analyzed by security module 128 or network security module 126a or 126b to determine if the code is trusted or untrusted. At 314, the system determines if the executable process is signed by a trusted source. If the executable process is signed by a trusted source, then the code is classified as trusted and is validated, as in 316. If the code is not signed by a trusted source, then the system determines if the executable process matches a trusted hash of executable processes, as in 318. If the executable process matches a trusted hash of executable processes, then the code is classified as trusted and is validated, as in 316. If the executable process does not match a trusted hash of executable processes, then the code is classified as untrusted and is not validated, as in 310.

Figure 4:
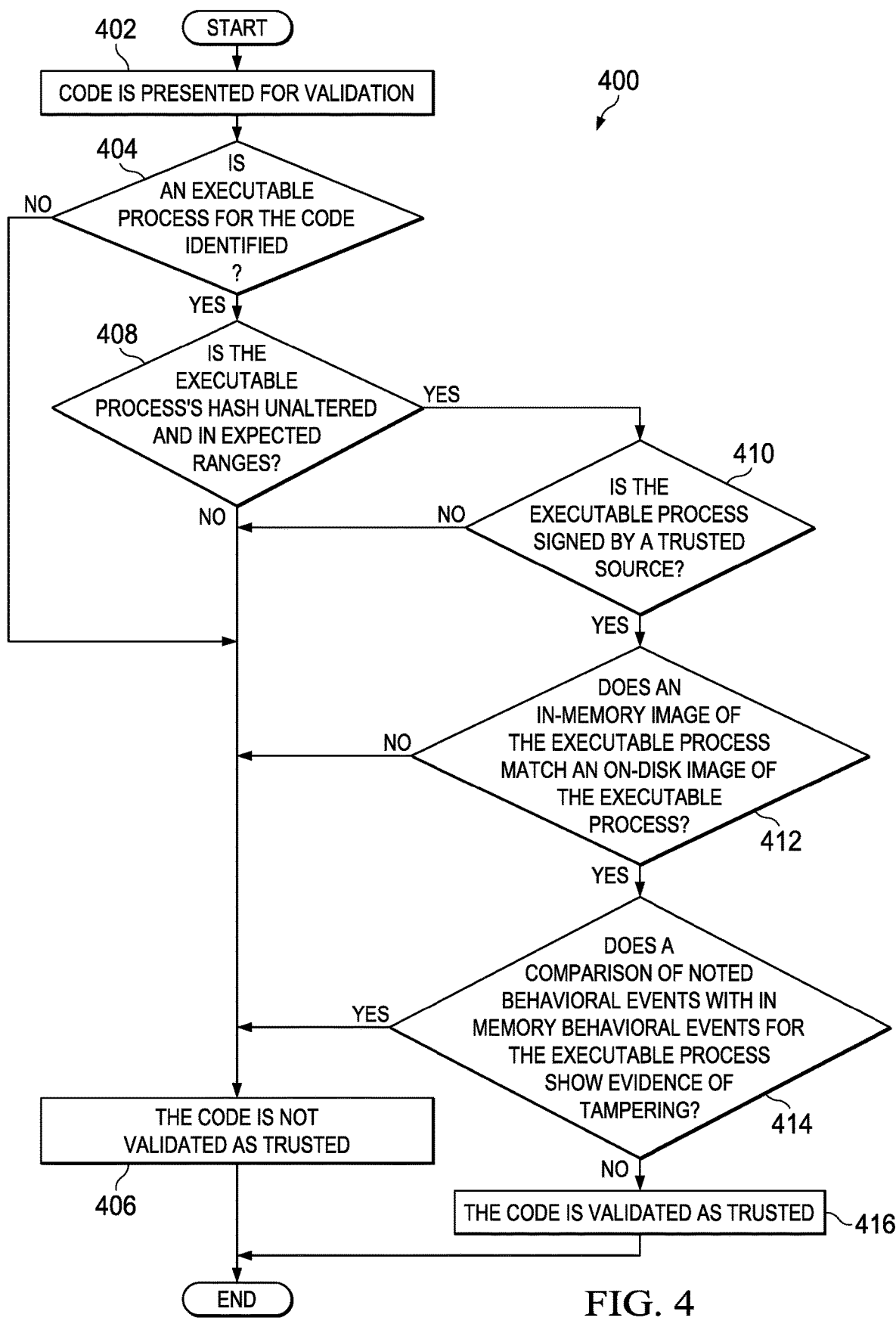
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the identification of a malicious execution of a process, in accordance with an embodiment. In an embodiment, one or more operations of flow 400 may be performed by execution profiling module 112 and network security module 126a and 126b. At 402, code is presented for validation. At 404, the system determines if an executable process for the code is identified. If an executable process for the code is not identified, then the code is not validated as trusted, as in 406. If an executable process for the code is identified, then the system determines if the executable process's hash is unaltered and in expected ranges, as in 408. If the executable process's hash is not unaltered or is not in expected ranges, then the code is not validated as trusted, as in 406. If the executable process's hash is unaltered and is in expected ranges, then they system determines if the executable is signed by a trusted source, as in 410. If the process is not signed by a trusted source, then the code is not validated as trusted, as in 406. If the process is signed by a trusted source, then the system determines if an in-memory image of the executable process matches an on-disk image of the executable process, as in 412. For example, a RAM memory image of the executable process (e.g., memory image of a process 132) can be compared to a hard disk image of the process (e.g., disk image of a process 134). If an in-memory image of the executable process does not match an on-disk image of the executable process, then the code is not validated as trusted, as in 406. If an in-memory image of the executable process matches an on-disk image of the executable process, then the system determines if a comparison of noted behavioral events with in memory behavioral events for the executable process shows evidence of tampering, as in 406. If the comparison of noted behavioral events with in memory behavioral events for the executable process shows evidence of tampering, then the code is not validated as trusted, as in 406. If the comparison of noted behavioral events with in memory behavioral events for the executable process does not show evidence of tampering, then the code is validated as trusted, as in 416.

Figure 5:
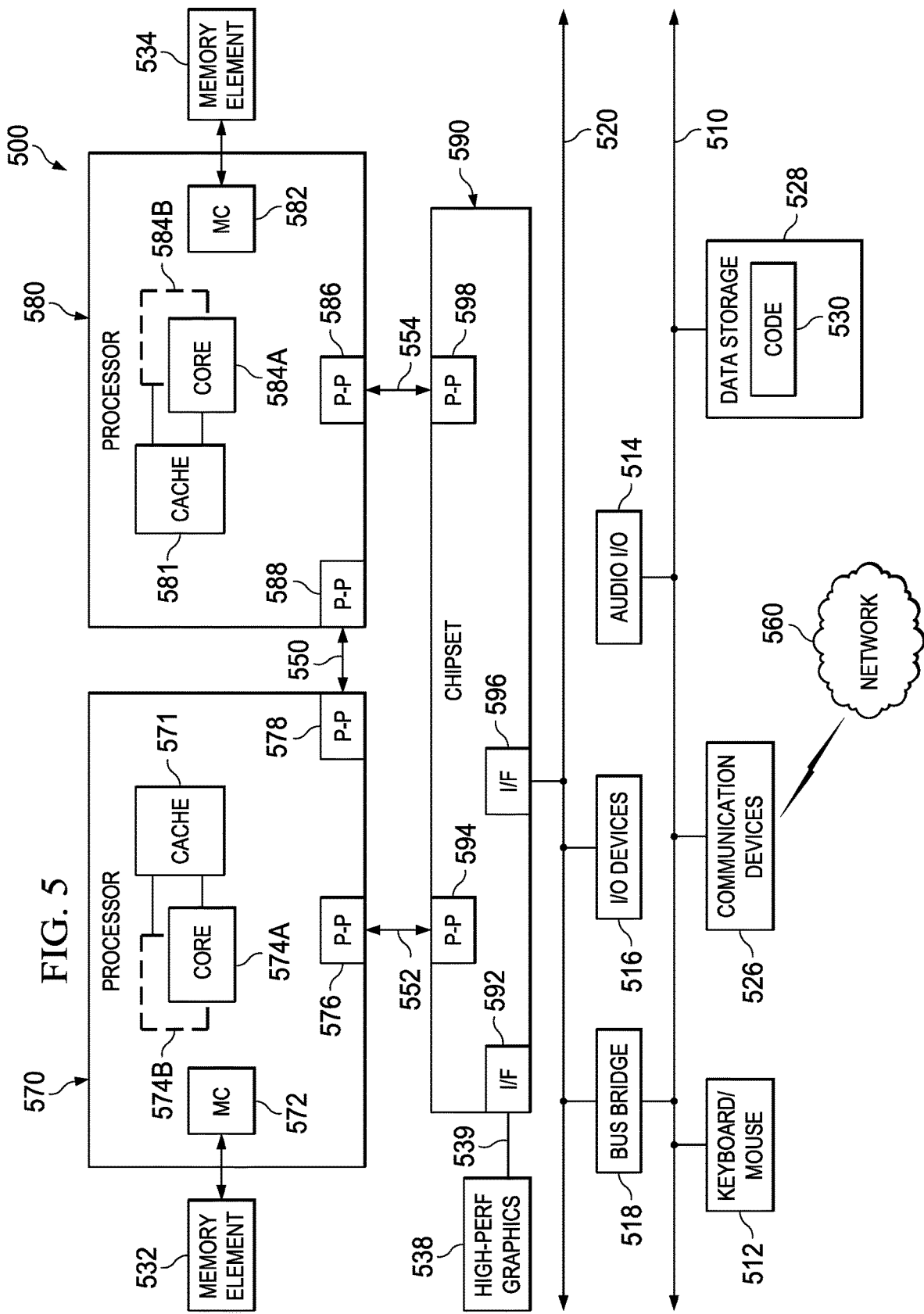
FIG. 5 is a block diagram illustrating an example computing system that is arranged in a point-to-point configuration in accordance with an embodiment.

FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 1-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor and may exchange data via a point-to-point (PtP) interface 550 using point-to-point interface circuits 578 and 588, respectively. Processors 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 6:
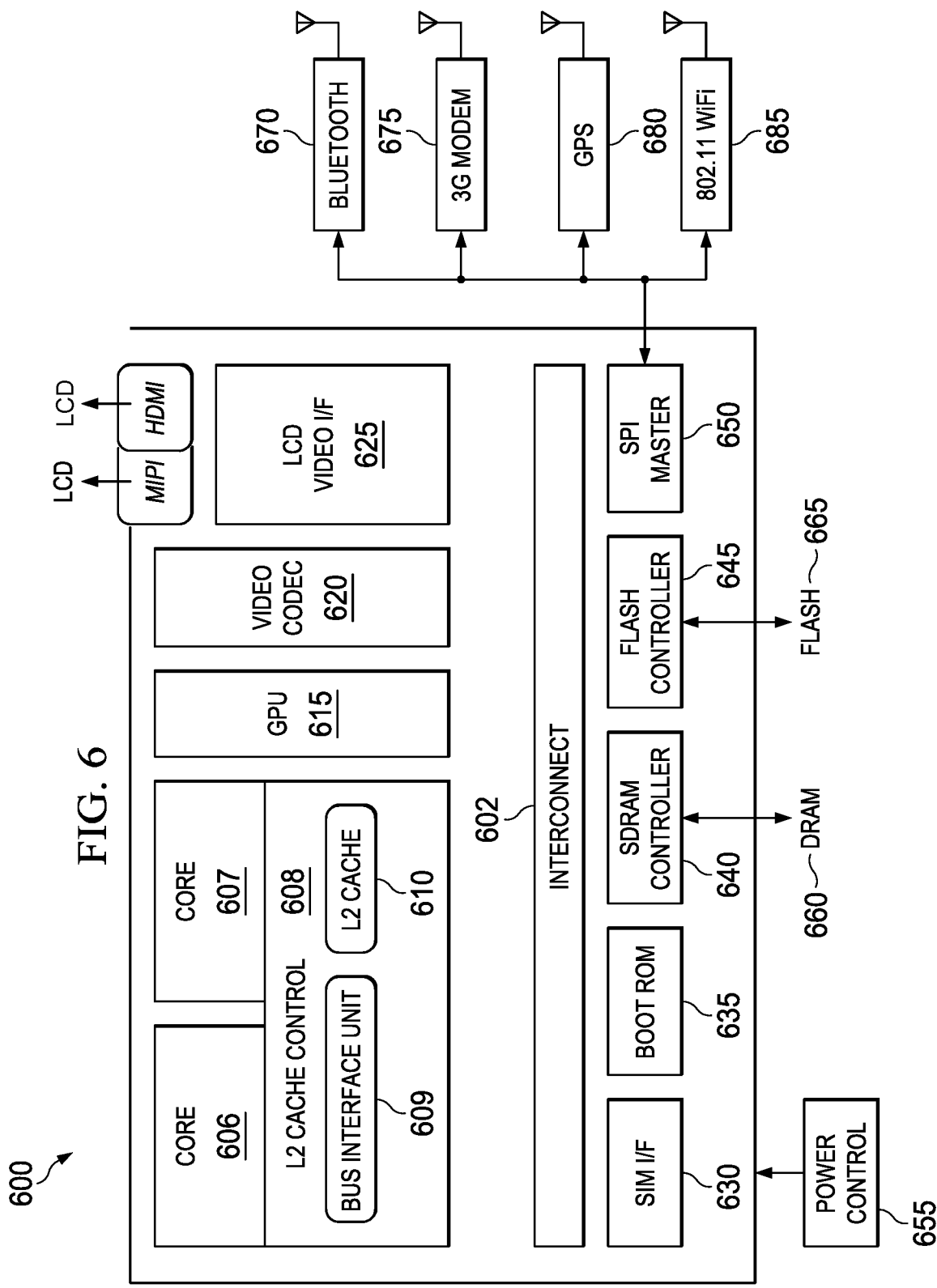
FIG. 6 is a simplified block diagram associated with an example ARM ecosystem system on chip (SOC) of the present disclosure.

Turning to FIG. 6, FIG. 6 is a simplified block diagram associated with an example ARM ecosystem SOC 600 of the present disclosure. At least one example implementation of the present disclosure can include the identification of malicious execution of a process features discussed herein and an ARM component. For example, the example of FIG. 6 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 6, ARM ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more example embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
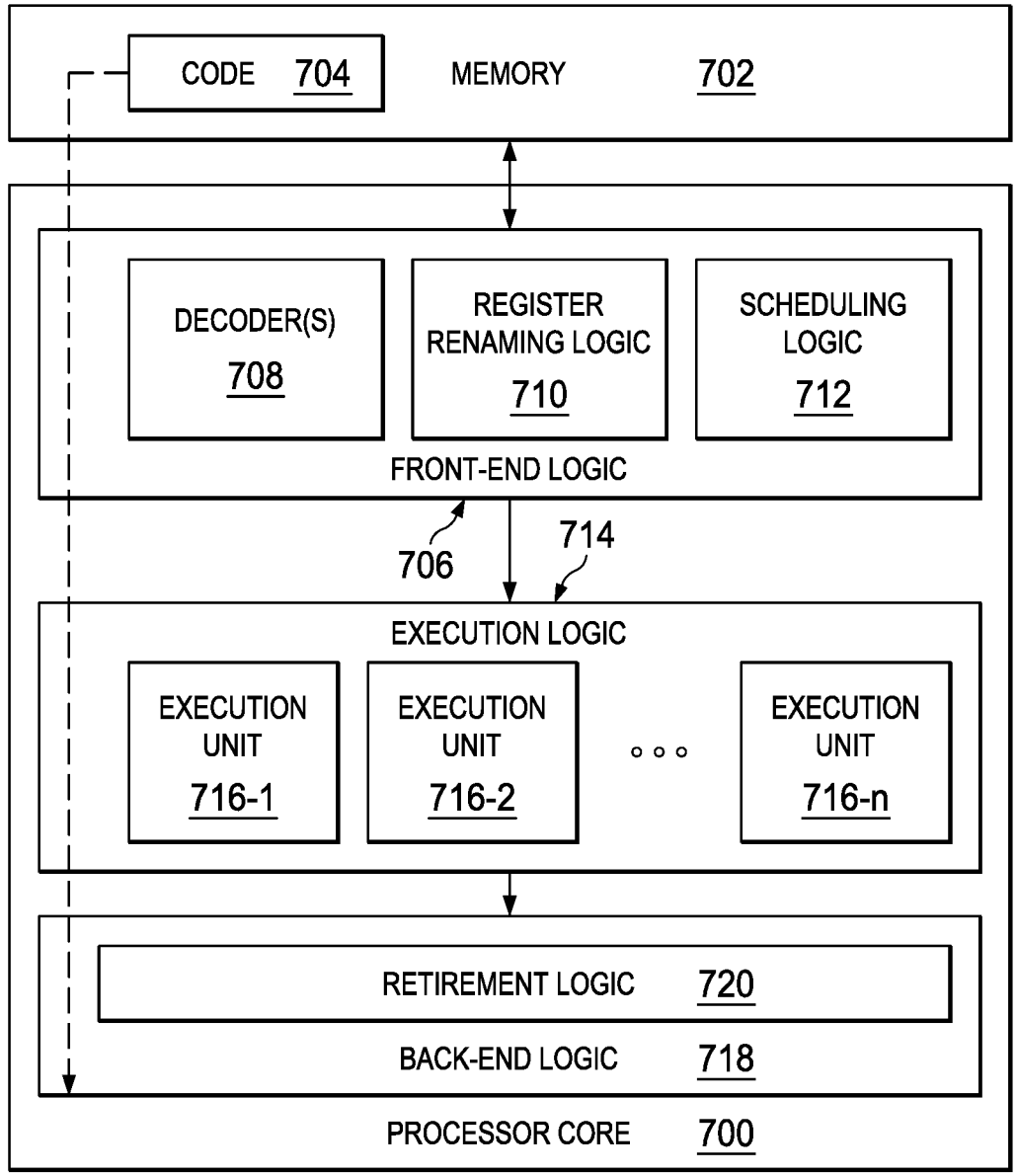
FIG. 7 is a block diagram illustrating an example processor core in accordance with an embodiment.

FIG. 7 illustrates a processor core 700 according to an embodiment. Processor core 700 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents one example embodiment of processors cores 574a, 574b, 574a, and 574b shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 2-4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to intercept a process, store execution profiling for the process if the process involves a privileged resource or a privileged operation, analyze code involved in each stack frame for the process to determine malicious activity, and trigger a security violation if malicious activity is determined.

In Example C2, the subject matter of Example C1 can optionally include where the one or more instructions that when executed by the at least one processor, further cause the processor to allow the process if the process does not involve a privileged resource or a privileged operation.

In Example C3, the subject matter of any one of Examples C1-C2 can optionally include where an origin of the code involved in each stack frame is determined and analyzed.

In Example C4, the subject matter of any one of Examples C1-C3 can optionally include where the one or more instructions that when executed by the at least one processor, further cause the processor to determine if the code involved for the process is signed by a trusted source.

In Example C5, the subject matter of any one of Examples C1-C4 can optionally include where the one or more instructions that when executed by the at least one processor, further cause the processor to determine if the code matches a hash of a trusted executable processes.

In Example C6, the subject matter of any one of Example C1-C5 can optionally include where each stack frame is analyzed as it unwinds.

In Example C7, the subject matter of any one of Examples C1-C6 can optionally include where the one or more instructions that when executed by the at least one processor, further cause the processor to determine if an in memory image of the process matches an on disk image of the process.

In Example C8, the subject matter of any one of Examples C1-C7 can optionally include where the one or more instructions that when executed by the at least one processor, further cause the processor to compare behavioral events with in memory behavioral events to determine if the process shows evidence of tampering.

In Example A1, an electronic device can include an execution profiling module, where the execution profiling module is configured to intercept a process, store execution profiling for the process if the process involves a privileged resource or a privileged operation, analyze code involved in each stack frame for the process to determine malicious activity, and trigger a security violation if malicious activity is determined.

In Example, A2, the subject matter of Example A1 can optionally include where the execution profiling module is further configured to allow the process if the process does not involve a privileged resource or a privileged operation.

In Example A3, the subject matter of any one of Examples A1-A2 can optionally include where an origin of the code involved in each stack frame is determined and analyzed.

In Example A4, the subject matter of any one of Examples A1-A3 can optionally include where the execution profiling module is further configured to determine if the code involved for the process is signed by a trusted source.

In Example A5, the subject matter of any one of Examples A1-A4 can optionally include where the execution profiling module is further configured to determine if the process matches a hash of a trusted executable processes.

In Example A6, the subject matter of any one of Examples A1-A5 can optionally include where each stack frame is analyzed as it unwinds.

In Example A7, the subject matter of any one of Examples A1-A6 can optionally include where the execution profiling module is further configured to determine if an in memory image of the process matches an on disk image of the process.

In Example A8, the subject matter of any one of Examples A1-A7 can optionally include where the execution profiling module is further configured to compare behavioral events with in memory behavioral events to determine if the process shows evidence of tampering.

Example M1 is a method including intercepting a process, storing execution profiling for the process if the process involves a privileged resource or a privileged operation, analyzing code involved in each stack frame for the process to determine malicious activity, and triggering a security violation if malicious activity is determined.

In Example M2, the subject matter of Example M1 can optionally include allowing the process if the process does not involve a privileged resource or a privileged operation.

In Example M3, the subject matter of any one of the Examples M1-M2 can optionally include where an origin of the code involved in each stack frame is determined and analyzed.

In Example M4, the subject matter of any one of the Examples M1-M3 can optionally include determining if the process is signed by a trusted source.

In Example M5, the subject matter of any one of the Examples M1-M4 can optionally include determining if the process matches a hash of a trusted executable processes.

In Example M6, the subject matter of any one of the Examples M1-M5 can optionally include determining if the code involved in each stack frame resides in memory that is writeable.

In Example M7, the subject matter of any one of the Examples M1-M6 can optionally include where each stack frame is analyzed as it unwinds.

Example S1 is a system for identification of malicious execution of a process, the system including an execution profiling module, where the execution profiling module is configured for intercepting a process, storing execution profiling for the process if the process involves a privileged resource or a privileged operation, analyzing code involved in each stack frame for the process to determine malicious activity, wherein each stack frame is examined as it unwinds, and triggering a security violation if malicious activity is determined.

In Example S2, the subject matter of Example S1 can optionally include where an origin of the code involved in each stack frame is determined and analyzed.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A non-transitory computer-readable medium comprising one or more instructions that, when executed by a processor, cause the processor to:
   receive a code address, wherein the code address is an address of a memory location containing executable code;
   determine whether the code address is backed by an executable process configured to access sensitive and privileged resources or perform a privileged operation;
   disallow the executable process from running;
   determine, based on a determination that the code address is backed by the executable process configured to access sensitive and privileged resources or perform a privileged operation, whether the executable process is signed by a trusted source;
   determine, based on a determination that the executable process is not signed by a trusted source, whether a hash of the executable process matches a trusted hash;
   classify the executable code as trusted and validated based on the determination that the executable process is signed by the trusted source or matches the trusted hash; and
   allow, based on the executable code being classified as trusted and validated, the executable process to run.

2. The computer-readable medium of claim 1, further comprising one or more instructions that, when executed by the processor, further cause the processor to:
   classify the executable code as untrusted and not validated based on the determination that the executable process is not signed by the trusted source and does not match the trusted hash.

3. The computer-readable medium of claim 1, further comprising one or more instructions that, when executed by the processor, further cause the processor to:
   determine, based on the determination that the code address is not backed by the executable process, whether the code address is located in a tracked memory region.

4. The computer-readable medium of claim 3, further comprising one or more instructions that, when executed by the processor, further cause the processor to:
   classify, based on a determination that the code address is not located in the tracked memory region, the executable code as benign and not validated.

5. The computer-readable medium of claim 3, further comprising one or more instructions that, when executed by the processor, further cause the processor to:
   classify, based on a determination that the code address is located in the tracked memory region, the executable code as untrusted and not validated.

6. The computer-readable medium of claim 1, further comprising one or more instructions that, when executed by the processor, further cause the processor to:
   identify the executable process.

7. The computer-readable medium of claim 1, further comprising one or more instructions that, when executed by the processor, further cause the processor to:
   determine whether the hash of the executable process is unaltered and within expected ranges.

8. The computer-readable medium of claim 1, further comprising one or more instructions that, when executed by the processor, further cause the processor to:
   determine whether an in memory image of the executable process matches an on disk image of the executable process.

9. The computer-readable medium of claim 1, further comprising one or more instructions that, when executed by the processor, further cause the processor to:
   compare behavioral events with in memory behavioral events to determine whether the executable process shows evidence of tampering.

10. An apparatus comprising:
   memory;
   a hardware processor configured to:
      receive a code address, wherein the code address is an address of a memory location containing executable code;
      determine whether the code address is backed by an executable process configured to access sensitive and privileged resources or perform a privileged operation;
      disallow the executable process from running;

determine, based on a determination that the code address is backed by the executable process configured to access sensitive and privileged resources or perform a privileged operation, whether the executable process is signed by a trusted source;

determine, based on a determination that the executable process is not signed by a trusted source, whether a hash of the executable process matches a trusted hash;

classify the executable code as trusted and validated based on the determination that the executable process is signed by the trusted source or matches the trusted hash; and allow, based on the executable code being classified as trusted and validated, the executable process to run.

11. The apparatus of claim 10, wherein the processor is further configured to:

classify the executable code as untrusted and not validated based on the determination that the executable process is not signed by the trusted source and does not match the trusted hash.

12. The apparatus of claim 10, wherein the processor is further configured to:

determine, based on the determination that the code address is not backed by the executable process, whether the code address is located in a tracked memory region.

13. The apparatus of claim 12, wherein the processor is further configured to:

classify, based on a determination that the code address is not located in the tracked memory region, the executable code as benign and not validated.

14. The apparatus of claim 12, wherein the processor is further configured to:

classify, based on a determination that the code address is located in the tracked memory region, the executable code as untrusted and not validated.

15. The apparatus of claim 10, wherein the processor is further configured to:

identify the executable process.

16. A method comprising:

receiving a code address, wherein the code address is an address of a memory location containing executable code;

determining whether the code address is backed by an executable process configured to access sensitive and privileged resources or perform a privileged operation;

disallowing the executable process from running;

determining, based on a determination that the code address is backed by the executable process configured to access sensitive and privileged resources or perform a privileged operation, whether the executable process is signed by a trusted source;

determining, based on a determination that the executable process is not signed by a trusted source, whether a hash of the executable process matches a trusted hash;

classifying the executable code as trusted and validated based on the determination that the executable process is signed by the trusted source or matches the trusted hash; and allowing, based on the executable code being classified as trusted and validated, the executable process to run.

17. The method of claim 16, further comprising:

classifying the executable code as untrusted and not validated based on the determination that the executable process is not signed by the trusted source and does not match the trusted hash.

18. The method of claim 16, further comprising:

determining, based on the determination that the code address is not backed by the executable process, whether the code address is located in a tracked memory region.

19. The method of claim 18, further comprising:

classifying, based on a determination that the code address is not located in the tracked memory region, the executable code as benign and not validated.

20. The method of claim 18, further comprising:

classifying, based on a determination that the code address is located in the tracked memory region, the executable code as untrusted and not validated.

* * * * *